United States Patent
Zang et al.

(10) Patent No.: US 12,049,128 B2
(45) Date of Patent: Jul. 30, 2024

(54) INTEGRATED ELECTRIC DRIVE SYSTEM AND ELECTRIC VEHICLE

(71) Applicant: Robert Bosch GmbH, Stuttgart (DE)

(72) Inventors: Xiaoyun Zang, Shanghai (CN); Qilin Huang, Shanghai (CN); Xudan Liu, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 17/753,500

(22) PCT Filed: Sep. 8, 2020

(86) PCT No.: PCT/EP2020/075005
§ 371 (c)(1),
(2) Date: Mar. 4, 2022

(87) PCT Pub. No.: WO2021/058273
PCT Pub. Date: Apr. 1, 2021

(65) Prior Publication Data
US 2022/0339997 A1    Oct. 27, 2022

(30) Foreign Application Priority Data
Sep. 27, 2019  (CN) .......................... 201910924340.6

(51) Int. Cl.
*H02K 11/33* (2016.01)
*B60K 1/00* (2006.01)
(Continued)

(52) U.S. Cl.
CPC ................ *B60K 1/00* (2013.01); *B60K 11/02* (2013.01); *B60K 17/04* (2013.01); *F16H 57/02* (2013.01);
(Continued)

(58) Field of Classification Search
CPC .......... B60K 1/00; B60K 11/02; B60K 17/04; B60K 2001/006; F16H 57/02;
(Continued)

(56) References Cited

U.S. PATENT DOCUMENTS

| 7,834,500 B2 * | 11/2010 | Savant ................... H02K 7/108 |
| | | 310/78 |
| 8,169,110 B2 * | 5/2012 | Swales ................... H02K 11/05 |
| | | 310/58 |

(Continued)

FOREIGN PATENT DOCUMENTS

| CN | 207790311 U | 8/2018 |
| DE | 10 2005 017 737 A1 | 10/2006 |

(Continued)

OTHER PUBLICATIONS

International Search Report corresponding to PCT Application No. PCT/EP2020/075005, mailed Nov. 27, 2020 (3 pages).

*Primary Examiner* — Jacob B Meyer
(74) *Attorney, Agent, or Firm* — Maginot, Moore & Beck LLP

(57) ABSTRACT

An integrated electric drive system includes an electric machine having a first housing and an output shaft, a transmission having a second housing and a drive shaft, and a power electronics module with a third housing and an electronic device configured to provide electric power for the electric machine. The transmission receives an input torque of the output shaft and outputs the same via the drive shaft. The power electronics module is configured to be arranged around the drive shaft. The integrated electric drive system can be installed on an electric vehicle. The integrated electric drive system has a more compact structure with a higher degree of integration, and better heat dissipation (Continued)

capability, facilitating spatial optimization and lightweight design of the electric vehicle.

9 Claims, 2 Drawing Sheets

(51) Int. Cl.
*B60K 11/02* (2006.01)
*B60K 17/04* (2006.01)
*F16H 57/02* (2012.01)
*F16H 57/04* (2010.01)
*H02K 5/20* (2006.01)
*H02K 5/22* (2006.01)
*H02K 7/116* (2006.01)
*H02K 9/19* (2006.01)

(52) U.S. Cl.
CPC ..... *F16H 57/0415* (2013.01); *F16H 57/0476* (2013.01); *H02K 5/203* (2021.01); *H02K 5/225* (2013.01); *H02K 7/116* (2013.01); *H02K 9/19* (2013.01); *H02K 11/33* (2016.01); *B60K 2001/006* (2013.01); *F16H 2057/02034* (2013.01); *F16H 2057/02043* (2013.01)

(58) Field of Classification Search
CPC ............. F16H 57/0415; F16H 57/0476; F16H 2057/02034; F16H 2057/02043; H02K 5/203; H02K 5/225; H02K 7/116; H02K 9/19; H02K 11/33
See application file for complete search history.

(56) References Cited

U.S. PATENT DOCUMENTS

| | | | | |
|---|---|---|---|---|
| 8,678,115 B2 * | 3/2014 | Kasuya | ................... | H02K 9/19 |
| | | | | 310/40 R |
| 9,976,333 B2 * | 5/2018 | Huck | ................... | H02K 11/215 |
| 10,464,633 B2 * | 11/2019 | Zhu | ........................ | B62M 11/02 |
| 11,271,449 B2 * | 3/2022 | Domsik | ................ | H01R 39/38 |
| 11,522,416 B2 * | 12/2022 | Deng | ........................ | B60K 6/26 |
| 11,764,652 B2 * | 9/2023 | Saber | ..................... | H02K 7/003 |
| | | | | 310/68 R |
| 2016/0276895 A1 * | 9/2016 | Aizawa | ................... | H02K 3/46 |
| 2017/0077779 A1 * | 3/2017 | Hanioka | ................. | H02K 5/22 |
| 2019/0186617 A1 * | 6/2019 | Verbridge | ............... | F16H 57/02 |
| 2020/0014285 A1 * | 1/2020 | Chang | ................... | H02K 5/207 |
| 2022/0339997 A1 * | 10/2022 | Zang | ....................... | F16H 57/02 |
| 2023/0261547 A1 * | 8/2023 | Schleining | ............ | H02K 5/203 |
| | | | | 310/54 |

FOREIGN PATENT DOCUMENTS

| | | | | |
|---|---|---|---|---|
| DE | 10 2017 120 985 A1 | | 3/2018 | |
| DE | 102019206525 A1 * | | 11/2020 | ............ B60K 17/08 |
| JP | 2003-309903 A | | 10/2003 | |
| JP | 2014-234052 A | | 12/2014 | |
| WO | WO-2006108531 A2 * | | 10/2006 | .......... B60K 17/043 |
| WO | WO-2008014734 A1 * | | 2/2008 | ............. H02K 15/14 |
| WO | 2019/118866 A1 | | 6/2019 | |
| WO | WO-2020127858 A1 * | | 6/2020 | ............. H02K 11/33 |
| WO | WO-2021058273 A1 * | | 4/2021 | .............. B60K 1/00 |
| WO | WO-2024009024 A1 * | | 1/2024 | ........... B64D 27/026 |

* cited by examiner

INTEGRATED ELECTRIC DRIVE SYSTEM AND ELECTRIC VEHICLE

This application is a 35 U.S.C. § 371 National Stage Application of PCT/EP2020/075005, filed on Sep. 8, 2020 which claims the benefit of priority to Serial No. CN 201910924340.6, filed on Sep. 27, 2019 in China, the disclosures of which are incorporated herein by reference in their entireties.

TECHNICAL FIELD

The present application relates to the technical field of vehicle drive, in particular to an integrated electric drive system and an electric vehicle comprising same.

BACKGROUND

As the energy crisis and environmental pollution problem are taken seriously and electric drive technology develops, more and more vehicles are using an onboard power supply for motive power, driving the vehicle to move by means of an electric drive system (eAxle, also called "electric drive axle" or "electric axle", etc.). The electric drive system is essentially a motive power drive assembly integrating an electric machine, transmission and power electronics module (e.g. inverter). This kind of integrated electric drive system has obvious advantages in terms of increasing power density, reducing the number of components, shortening the length of high-voltage cables, and structural compactness.

In an existing integrated electric drive system, a housing of the electric machine is connected in a fixed manner to, or integrally formed with, a transmission housing; an output shaft of the electric machine drives a speed-changing mechanism in the transmission, and in turn drives a drive shaft of the transmission to drive the wheels of the electric vehicle. Due to the movement cooperation relationship between the electric machine and the transmission, the electric machine and transmission are generally coupled in a fixed manner in the direction of extension of the electric machine output shaft; the electric machine output shaft and transmission drive shaft may be configured to be arranged at the same side, or at two sides, of the transmission according to layout. To avoid taking up too much space, the power electronics module may be arranged at one side of the transmission drive shaft, e.g. at an upper side, lower side, left side or right side of the transmission drive shaft. Thus, a space between the transmission and a vehicle wheel may be used to accommodate the power electronics module. However, such a layout still has drawbacks; for example, when the power electronics module is arranged at one side of the transmission drive shaft, the amount of space at this side limits the dimensions of the power electronics module, affecting the arrangement and heat dissipation of an electronic device in the power electronics module, and at the same time, a space at the other side of the drive shaft is unused, so space is wasted.

Thus, there is a need to make improvements to the existing integrated electric drive system, in order to make full use of space and achieve efficient heat dissipation.

SUMMARY

An object of the present application is to propose an integrated electric drive system, to overcome the abovementioned technical problem.

To this end, according to one aspect of the present application, an integrated electric drive system is provided, comprising:
an electric machine, comprising a first housing and an output shaft;
a transmission, comprising a second housing and a drive shaft, the transmission receiving an input torque of the output shaft and outputting same via the drive shaft;
a power electronics module, comprising a third housing and an electronic device, the electronic device being configured to provide electric power for the electric machine;
wherein the power electronics module is configured to be arranged around the drive shaft.

Optionally, the power electronics module is configured to be a hollow structure, and the drive shaft passes through the third housing of the power electronics module.

Optionally, the electronic device is arranged around the drive shaft, inside the third housing.

Optionally, the power electronics module and the electric machine are arranged at the same side of the transmission, and the third housing is connected to, or integrally formed with, the first housing; or the first housing, the second housing and the third housing are connected or integrally formed.

Optionally, at least one of the first housing, the second housing and the third housing is provided with a cooling circuit.

Optionally, a first cooling circuit of the first housing and a third cooling circuit of the third housing are connected.

Optionally, a first cooling circuit of the first housing, a second cooling circuit of the second housing and a third cooling circuit of the third housing are connected.

Optionally, a connection port is provided on the third housing, the connection port being connectable to an external circuit.

According to another aspect of the present application, an electric vehicle is provided, comprising the integrated electric drive system described above.

The integrated electric drive system of the present application can make full use of space around the drive shaft of the transmission, making the assembly as a whole more compact, making the installation space smaller, and facilitating the arrangement of the cooling circuits, to further increase the heat dissipation capability.

BRIEF DESCRIPTION OF THE DRAWINGS

Demonstrative embodiments of the present application will be described in detail below with reference to the drawings. It should be understood that the embodiments described below are merely intended to explain the present application, without limiting the scope thereof. In the drawings.

DETAILED DESCRIPTION

Figure 1:
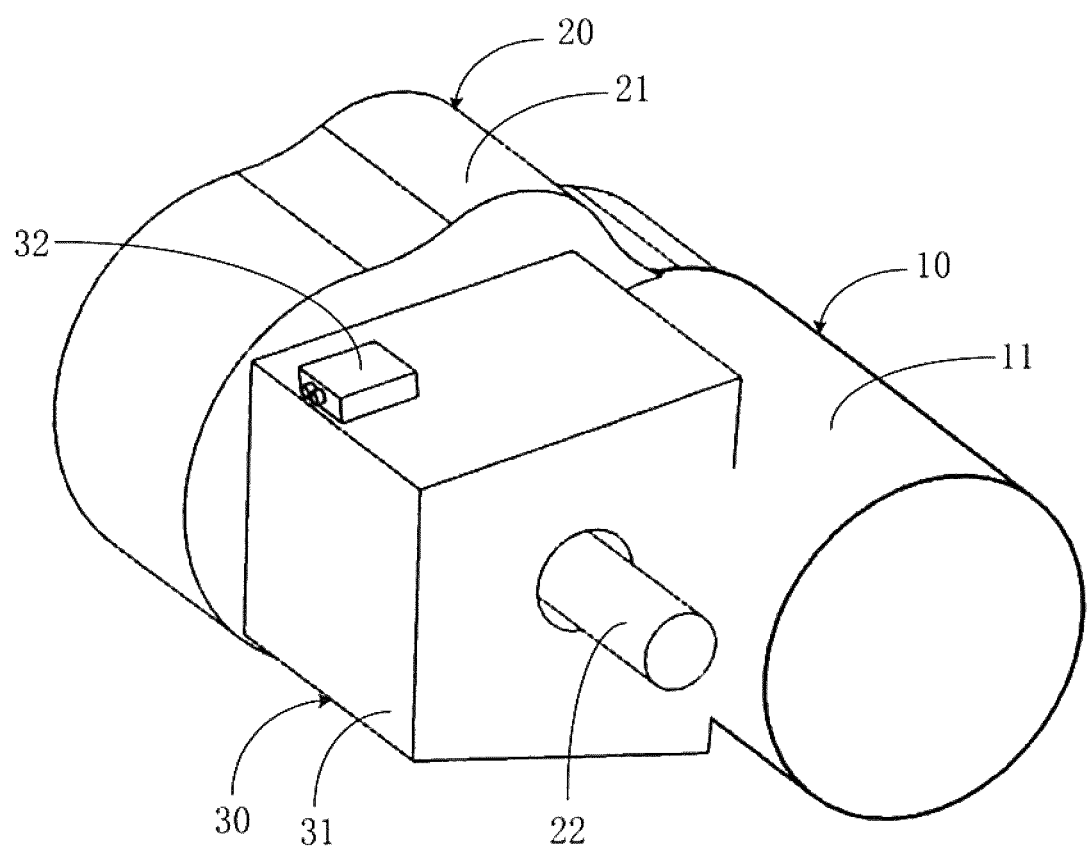
FIG. 1 is a schematic perspective view of an integrated electric drive system according to an embodiment of the present application.

Preferred embodiments of the present application are described in detail below with reference to examples. In the embodiments of the present application, an integrated electric drive system for an electric vehicle is taken as an example to describe the present application. However, those skilled in the art should understand that these demonstrative embodiments do not signify any limitation of the present application. In addition, in the absence of conflict, features in embodiments of the present application may be combined with each other. In different drawings, identical or similar components are indicated by identical reference labels, and in the interests of conciseness, other components are omitted, but this does not indicate that the integrated electric drive system of the present application cannot include other components. It should be understood that component sizes, proportional relations and component quantities in the drawings are not limitations on the present application.

As shown in FIG. 1, the integrated electric drive system according to an embodiment of the present application essentially comprises an electric machine 10, a transmission 20 and a power electronics module 30. The electric machine 10 may comprise a first housing 11 and an output shaft (not shown in FIG. 1). The transmission 20 may comprise a second housing 21 and a drive shaft 22; the transmission 20 receives an input torque of the output shaft of the electric machine 10 and outputs same via the drive shaft 22, to drive the wheels of the electric vehicle to rotate. The power electronics module 30 may comprise a third housing 31 and an electronic device (not shown in FIG. 1); the electronic device is configured to provide electric power for the electric machine 10. The power electronics module 30 may be an inverter for example. It should be pointed out that the power electronics module 30 of the integrated electric drive system of the present application is configured to be arranged around the drive shaft 22 of the transmission 20, as shown in FIG. 1. That is to say, the power electronics module 30 is configured to be a hollow structure, and the drive shaft 22 passes through the third housing 31 of the power electronics module 30. Correspondingly, the electronic device of the power electronics module 30 may be arranged around the drive shaft 22, inside the third housing 31. Thus, by forming the power electronics module 30 and the drive shaft 22 of the transmission 20 as a nested structure, full use can be made of the space around the drive shaft 22, making the apparatus as a whole more compact, making the installation space smaller, and correspondingly, the space utilized in the vehicle can be increased.

It should be pointed out that in the embodiment of the present application shown in FIG. 1, the drive shaft 22 of the transmission 20 and the electric machine 10 are arranged in parallel, i.e. the drive shaft 22 of the transmission 20 and the electric machine 10 are arranged at the same side of the transmission 20, and correspondingly, the power electronics module 30 and the electric machine 10 are arranged at the same side of the transmission 20. However, in an embodiment in which the drive shaft 22 of the transmission 20 and the electric machine 10 are arranged at two sides of the transmission 20 respectively, the power electronics module 30 can likewise make full use of all of the space around the drive shaft 22, and the amount of space left unused can be reduced as compared with an existing arrangement structure.

A connection port 32 may be provided on the third housing 31, e.g. an auxiliary component of a port expansion unit (PEU), e.g. a DC-DC connector. The connection port 32 may be connected to an external circuit, e.g. a power supply circuit of an external power source, a control circuit of a controller, etc. Thus, the connection port 32 can also make full use of space at the periphery of the drive shaft 22, facilitating the arrangement of the connection port 32.

As shown in FIG. 1, in the case where the power electronics module 30 and electric machine 10 are arranged at the same side of the transmission 20, the third housing 31 of the power electronics module 30 may be connected to, or integrally formed with, the first housing 11 of the electric machine 10. This can make the structure of the apparatus as a whole more compact, facilitating installation, and can shorten the cable length from the power electronics module 30 to the electric machine 10, thereby reducing cost and weight. Of course, in another embodiment of the present application, the first housing 11 of the electric machine 10, the second housing 21 of the transmission 20 and the third housing 31 of the power electronics module 30 may also be closely connected or integrally formed; this can correspondingly achieve a further technical effect.

Figure 2:
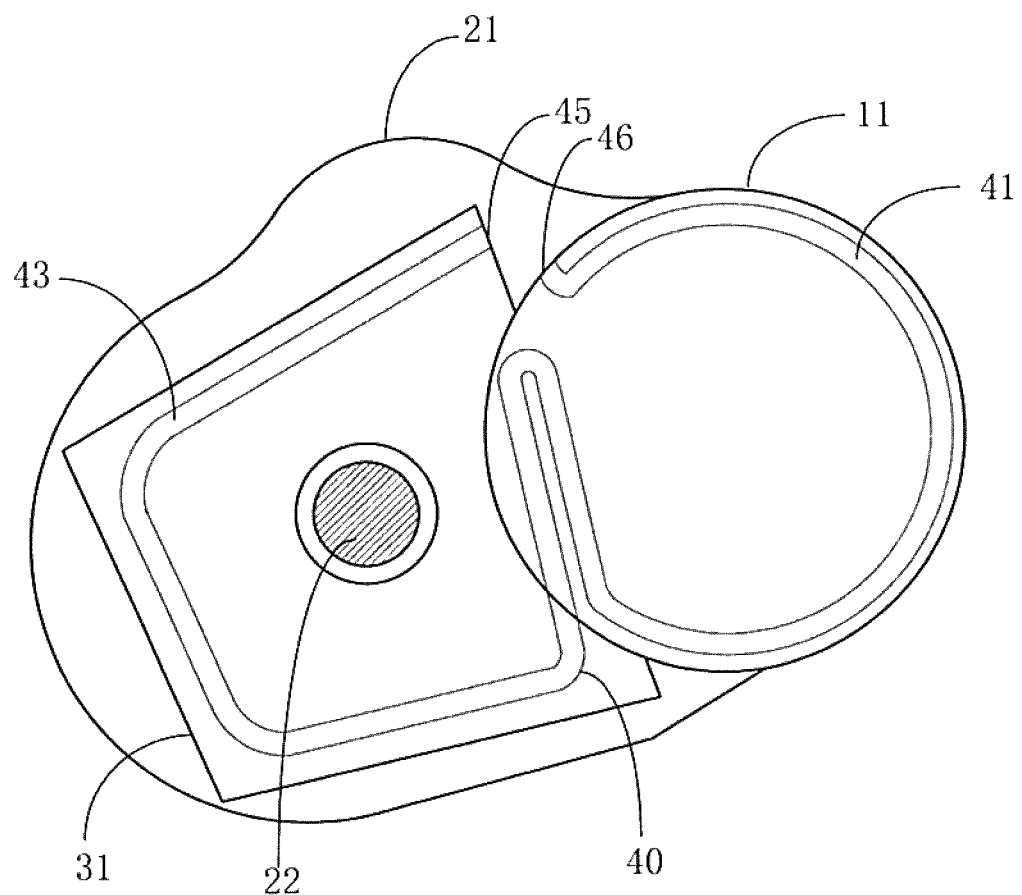
FIG. 2 is a schematic sectional view of the integrated electric drive system in FIG. 1, in which only the corresponding housings and cooling circuits have been retained.

To enable the integrated electric drive system of the present application to obtain sufficient cooling, a cooling circuit may be disposed in at least one of the first housing 11 of the electric machine 10, the second housing 21 of the transmission 20 and the third housing 31 of the power electronics module 30. FIG. 2 shows a first cooling circuit 41 disposed in the first housing 11 of the electric machine 10, and a third cooling circuit 43 disposed in the third housing of the power electronics module 30; the first cooling circuit 41 and third cooling circuit 43 are connected to each other to form a common cooling circuit 40. Of course, in another embodiment of the present application, the first cooling circuit 41 of the first housing 10, a second cooling circuit (not shown in FIG. 2) of the second housing 21 and the third cooling circuit 43 of the third housing 30 may also be connected to each other. Thus, by forming a common cooling circuit, a higher degree of integrated cooling can be achieved, reducing the number of components and easing maintenance work. Furthermore, FIG. 2 also shows a cooling liquid inlet 45 and a cooling liquid outlet 46 of the common cooling circuit 40, wherein the cooling liquid inlet 45 is disposed on the third housing 31, and the cooling liquid outlet 46 is disposed on the first housing 11. However, the cooling liquid inlet 45 and cooling liquid outlet 46 may also be disposed on the same housing.

According to another embodiment of the present application, the electric vehicle may comprise the integrated electric drive system described above, and may further comprise a vehicle body structure, a motive power battery, steering and braking structures, etc.; these are not described further here.

The integrated electric drive system of the present application has a more compact structure with a higher degree of integration, and better heat dissipation capability, and when installed on the electric vehicle, facilitates spatial optimization and lightweight design of the electric vehicle.

The present application has been described in detail above with reference to particular embodiments. Clearly, all of the embodiments described above and shown in the drawings should be understood to be demonstrative, without limiting the present application. For example, in the preferred embodiments, an integrated electric drive system for an electric vehicle was taken as an example to describe the present application, but the present application can be applied not only in the field of electric vehicles, but also in any field in which it is necessary to use an integrated electric drive system to provide a driving action. Those skilled in the art could make various alterations or amendments to the present application without departing from the spirit thereof, all such alterations or amendments falling within the scope of the present application.

The invention claimed is:

1. An integrated electric drive system comprising:
   an electric machine, comprising a first housing and an output shaft;
   a transmission comprising a second housing and a drive shaft, the transmission receiving an input torque of the output shaft and outputting the input torque via the drive shaft; and
   a power electronics module, comprising a third housing and an electronic device, the electronic device being configured to provide electric power for the electric machine,
   wherein the power electronics module is configured to be arranged around the drive shaft.

2. The integrated electric drive system according to claim 1, wherein the power electronics module is configured as a hollow structure, and the drive shaft passes through the third housing of the power electronics module.

3. The integrated electric drive system according to claim 2, wherein the electronic device is arranged inside the third housing around the drive shaft.

4. The integrated electric drive system according to claim 1, wherein:
   the power electronics module and the electric machine are arranged at the same side of the transmission, and
   the third housings is connected to, or integrally formed with, the first housing; or
   the first housing, the second housing and the third housing are connected or integrally formed.

5. The integrated electric drive system according to claim 1, wherein at least one of the first housing, the second housing, and the third housing includes a cooling circuit.

6. The integrated electric drive system according to claim 1, wherein:
   the first housing includes a first cooling circuit,
   the third housing includes a third cooling circuit, and
   the first and third cooling circuits are connected.

7. The integrated electric drive system according to claim 1, wherein:
   the first housing includes a first cooling circuit,
   the second housing includes a second cooling circuit,
   the third housing includes a third cooling circuit, and
   the first, second, and third cooling circuits are connected.

8. The integrated electric drive system according to claim 1, wherein the third housing includes a connection port configured to connect to an external circuit.

9. An electric vehicle, comprising:
   an integrated electric drive system comprising:
      an electric machine comprising a first housing and an output shaft;
      a transmission comprising a second housing and a drive shaft, the transmission receiving an input torque of the output shaft and outputting the input torque via the drive shaft; and
      a power electronics module comprising a third housing and an electronic device, the electronic device being configured to provide electric power for the electric machine,
   wherein the power electronics module is configured to be arranged around the drive shaft.

* * * * *